United States Patent [19]

Farrell et al.

[11] Patent Number: 5,522,416
[45] Date of Patent: Jun. 4, 1996

[54] PNEUMATIC PRESSURE REGULATION SYSTEM

[75] Inventors: Philip S. E. Farrell, North York; Andrew A. Goldenberg, Toronto; Daniel Meidan, North York, all of Canada

[73] Assignee: Her Majesty the Queen in right of Canada, as represented by the Minister of Defence, Ottawa, Canada

[21] Appl. No.: 317,630

[22] Filed: Oct. 3, 1994

[30] Foreign Application Priority Data

Oct. 5, 1993 [CA] Canada .................................. 2107693

[51] Int. Cl.⁶ ........................... F16K 3/26; F16K 11/076; F16K 31/04
[52] U.S. Cl. ................. 137/38; 137/625.24; 137/625.32; 137/625.65; 251/129.11; 600/19
[58] Field of Search ................. 137/38, 625.24, 137/625.32, 625.65; 251/129.11; 600/19

[56] References Cited

U.S. PATENT DOCUMENTS

| 2,319,347 | 5/1943 | Reed | 251/107 |
|---|---|---|---|
| 2,593,733 | 4/1952 | Davies | 251/105 |
| 3,454,049 | 7/1969 | Hoos | 137/625.65 |
| 3,780,723 | 12/1973 | Van Patten | 128/1 A |
| 3,956,772 | 5/1976 | Cox | 2/2.1 A |
| 3,994,314 | 11/1976 | Hartley | 137/596.17 |
| 4,057,046 | 11/1977 | Kawaguchi | 128/24 R |
| 4,086,920 | 5/1978 | Miniere | 128/24 R |
| 4,219,039 | 8/1980 | Jaggars | 137/38 |
| 4,339,737 | 7/1982 | Meyers et al. | 251/129.11 X |
| 4,408,599 | 10/1983 | Mummert | 128/24 R |
| 4,512,546 | 4/1985 | Inada et al. | 251/65 |
| 4,548,383 | 10/1985 | Wolfges | 251/129 |
| 4,637,074 | 1/1987 | Teheri | 2/2 |
| 4,638,791 | 1/1987 | Krogh et al. | 128/1 A |
| 4,736,731 | 4/1988 | Van Patten | 128/1 A |
| 4,794,845 | 1/1989 | Vick | 137/625.65 X |
| 4,838,954 | 6/1989 | Perach | 137/625.65 |
| 4,895,320 | 1/1990 | Armstrong | 244/118.5 |
| 4,949,414 | 8/1990 | Thomas et al. | 5/453 |
| 5,007,893 | 4/1991 | Row | 600/20 |
| 5,083,745 | 1/1992 | Tischer | 251/129.11 |
| 5,226,410 | 7/1993 | Fournol | 128/202.11 |
| 5,349,983 | 9/1994 | Ozarowski et al. | 251/129.11 X |

FOREIGN PATENT DOCUMENTS

| 2455765 | 11/1980 | France . | |
| 61-262277 | 11/1986 | Japan | 251/129.11 |
| 61-278674 | 12/1986 | Japan | 251/129.11 |
| 1-176875 | 7/1989 | Japan | 251/129.11 |
| 2051311 | 1/1981 | United Kingdom . | |
| 2104249 | 3/1983 | United Kingdom | 137/625.24 |

OTHER PUBLICATIONS

Farrell et al Overhaul Instruction 1 Sep. 1973.
Burton et al Development, Test, etc 1979.
Positive Pressure Breathing 1978.
Crosbie et al Servo Operated Anti–G Suit 22 May 1984.
Van Patten et al Development of an Electro–Pneumatic etc. (undated).

Primary Examiner—Gerald A. Michalsky
Attorney, Agent, or Firm—Anthony Asquith & Co.

[57] ABSTRACT

An air pressure regulator includes a cylindrical rotor with a hollow interior. The thin walls of the rotor have windows which overlap inlet and exhaust windows in the housing. The rotor is rotated progressively by a stepper motor in response to computer determination of required pressure. The system is used to inflate a pilot's anti-G suit.

17 Claims, 5 Drawing Sheets

PNEUMATIC PRESSURE REGULATION SYSTEM

This invention relates to pneumatic pressure regulators of the kind in which pressure and flow of air (or another gas) into a receptacle have to be tightly controlled.

A particular example where the need arises for tight control of pressure and flow is in the supply of air to the inflatable bladders of an anti-G suit for a high performance fighter aircraft. The invention is also applicable to other cases where the pneumatic pressure to be regulated is subject to rapid changes, and where the pressure in the receptacle must accurately follow the changes.

As a general rule, conventional pneumatic systems lend themselves to applications where forces change rapidly. The difficulty has been that pneumatic systems did not perform well where tight, accurate control of the rapidly changing forces is required.

In a hydraulic system, the fact that the hydraulic fluid is incompressible permits the hydraulic fluid to be used as an incompressible, seemingly-solid, stable, force-transmitting column or strut. In a pneumatic system, on the other hand, the corresponding "strut" of air is not at all solid and stable, but is resilient and compressible to a marked degree. Hydraulic systems that have been developed for position-control, such as the linear-spool valves of the type used in hydraulic servo-systems, which provide a "solid" strut of a progressively variable or adjustable length, have no counterpart in the field of pneumatic pressure-control systems.

The conventional view of hydraulic and pneumatic systems is that hydraulics are necessary if accuracy of position-control is required, whereas pneumatics are favoured if force control is required without a particular need for accuracy of position. Neither system is quite right if both stable position-control and accurate force-control are required.

One disadvantage of hydraulic systems lies in the slowness with which the system takes up slack, and responds to changes in force. The low volumetric flow rate of the hydraulic liquid, as compared with air, is the limitation. The usefulness of hydraulic systems has therefore tended to be restricted to applications which require accurate position control at low fluid-flow rates. Hydraulic systems tend not to be favoured when the need is for moving large quantities of fluid. Even unsophisticated pneumatic systems on the other hand can quickly respond to changing force requirements, even if large quantities of fluid (air) need to be moved in order to change the force. However, one of the areas in which pneumatic systems are lacking is in the accuracy with which the large quantity of fluid can be gauged accurately enough that the selected new force is achieved without delay, and without overshooting (or undershooting).

Hydraulic systems often use analog control systems with proportional feedback, for position control. Pneumatic systems very rarely use analog control, with or without feedback, for any purpose, but rather tend to use simple on/off or open/closed controls.

The invention addresses the need for increased accuracy of control of pneumatic forces, pressures, and flow rates, especially in applications where the magnitude of the force is changing rapidly.

An aircraft pilot's anti-G suit has bladders or pockets having a total inflatable capacity in the region of 5 to 10 liters. The characteristics of the aircraft and of the pilors physiology dictate that pressure changes in the suit should take place in no more than about a second. The need for rapid response of the pressure regulation system arises because, if the suit is to be inflated to the correct pressure, ready for when the G-force actually comes on to the aircraft, only about a second or sometimes even only a half-second, is available for inflation. The bladders are pressurised to pressures up to a maximum of about 10 or 12 psi.

In conventional pressure regulation systems, even those which claimed to have rapid response, the inadequacies of the system were manifested in that if the pressure could change very quickly, the pressure tended to overshoot the required pressure; the only way the designer could address the problem of overshoot was by making the response time noticeably much slower.

One aspect of the regulation problem requires the admittance of large, gross, volumes of pressurised air rapidly into the receptacle; the other aspect requires the admittance of finely and accurately metered quantities of air to arrive at the required pressure without overshoot. It is an aim of the invention to provide a regulation system which eases the compromise between these two conflicting aspects.

Conventional pneumatic pressure regulators have included a spring, which urged the closure member to close off the aperture leading to the receptacle. Also, in the conventional regulator, the receptacle pressure acted on the closure member so that as the pressure in the receptacle approached the pressure set by the regulator, the aperture of the regulator started to become smaller. Although this constriction of the airflow tended to reduce overshoot, it is recognised that the presence of the spring acting on the valve closure member was a marked disadvantage, as was also the fact that the receptacle pressure acted on the closure member. In the conventional regulator, the closure member, and hence the size of the aperture, was under the control of the spring and the pressure, which led to instability, time lags, and lack of positive control, when used in a rapidly changing system.

The invention provides a pneumatic pressure regulation system in which the pressure and flow fed to the receptacle is entirely under the control of electrical signals, preferably the output from a computer. The aperture connecting the pressure source to the receptacle is of variable size, whereby the flow of air to the receptacle may be controlled, but the variation in the size of the aperture is not affected by pressure in the receptacle, nor by a setting of a spring, but only by electrical signals fed to the motor which adjusts the size of the aperture.

Exemplary embodiments of the invention will now be described with reference to the accompanying drawings, in which:

The structures shown in the accompanying drawings and described below are examples which embody the invention.

It should be noted that the scope of the invention is defined by the accompanying claims, and not necessarily by specific features of exemplary embodiments.

Figure 1:
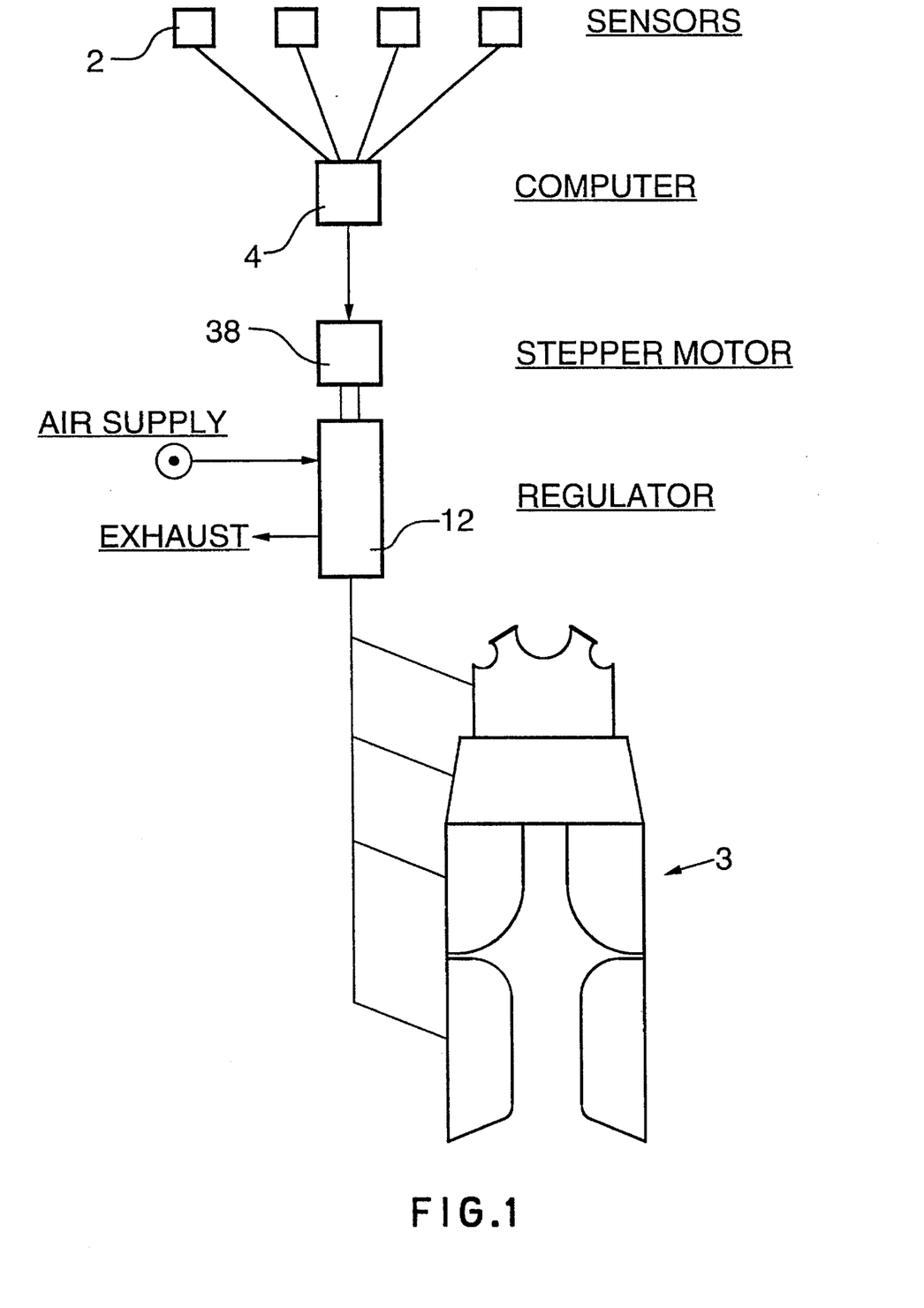
FIG. 1 is a block diagram of a pressure regulator system that embodies the invention, as used to regulate the pressure supplied to an aircraft pilot's anti-G suit.

FIG. 1 shows a series of sensors 2, which are set up to detect the various parameters on which the pressure in the receptacle 3 should depend. A computer 4 receives the signals from these sensors, and, using formulas, algorithms, empirical relationships, and the like, as previously programmed, makes a computation as to what pressure, under the circumstances, the receptacle 3 should be at. The computer then issues an appropriate voltage or other form of output signal to an actuator of a pressure regulator 12, which adjusts the pressure regulator to supply the desired pressure to the receptacle 3.

In the case of an aircraft anti-G suit, the sensors 2 may be set up to detect present G-force on the aircraft, present suit pressure, altitude and speed of the aircraft, position of control stick (which determines what the G-force will be in, say, half a second, or one second), and so on.

The computer 4 responds to the values of the parameters, and computes a figure for the desired pressure. This computation is done by the computer more or less immediately. If the parameters are varying rapidly, the computer changes the output signal for the desired pressure, which is again done more or less immediately.

No matter how fast the speed of response of the computer, for the receptacle 3 to be correctly pressurised at all times requires that air must be fed into and out of the suit with great response, rapidity, and accuracy.

Figure 2:
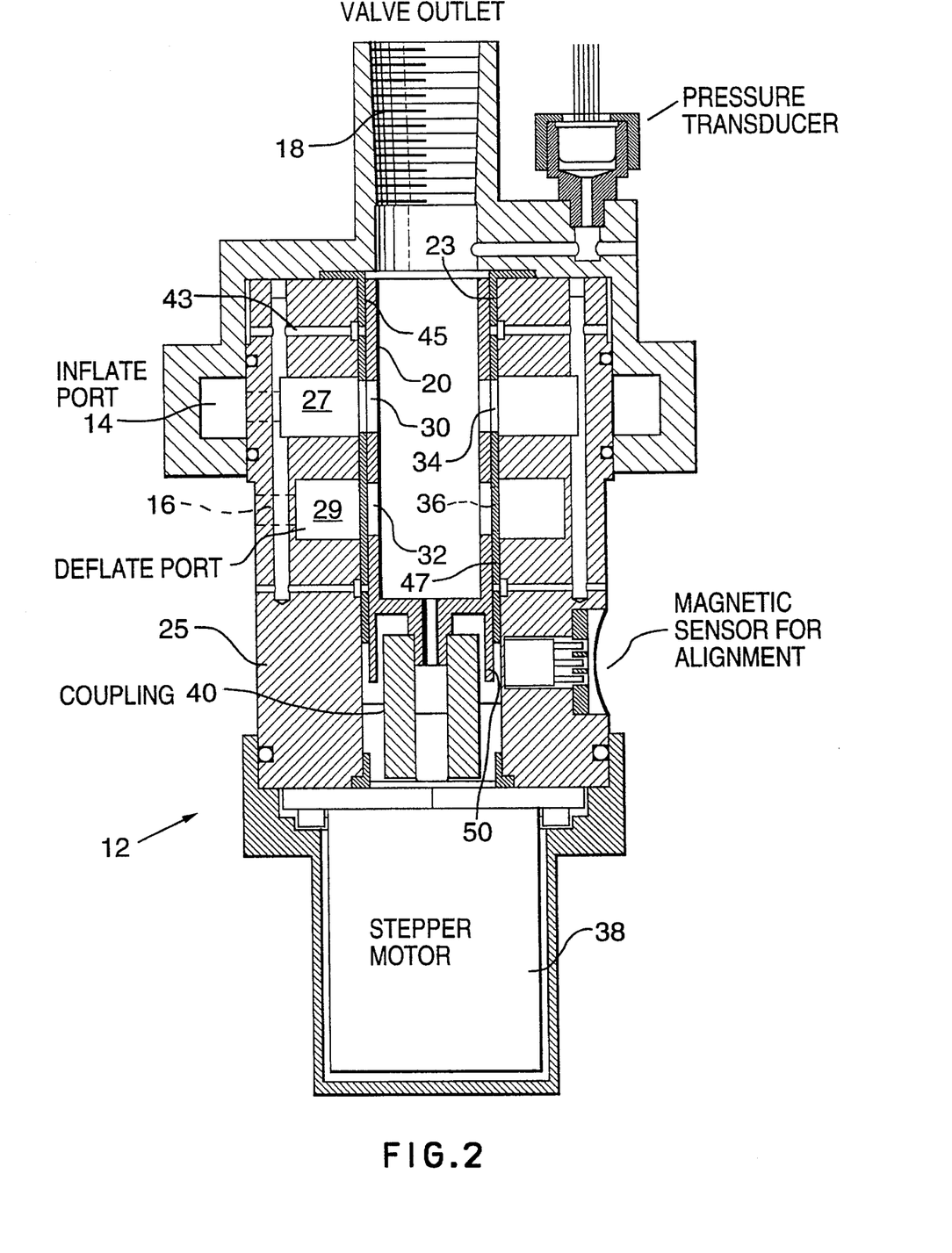
FIG. 2 is a cross-section of a pressure regulator, which is included in the system of FIG. 1.

FIG. 2 is an assembly drawing of the pressure regulator 12. The regulator is provided with a pressurised air supply, at inlet port 14, and an exhaust at exhaust port 16. Air at the regulated pressure is present in the pressure tube 18, which is connected to the pilot's anti-G suit. It is the task of the regulator 12, when the suit pressure is too low, to admit air from inlet port 14 into the pressure tube 18, and when the suit pressure is too high, to transfer air out of the pressure tube 18, and exhaust the air from exhaust port 16.

The regulator 12 includes a rotor 20. The rotor 20 is housed inside a hollow sleeve 23, The sleeve 23 is clamped or otherwise fixed into the housing 25 of the regulator against rotary or other movement.

The housing 25 is formed with annular grooves, which are disposed radially outwards from inside the interior of the housing. The grooves are an inlet groove 27 and an exhaust groove 29. The inlet and exhaust ports 14,16 communicate with these grooves.

Figure 3:
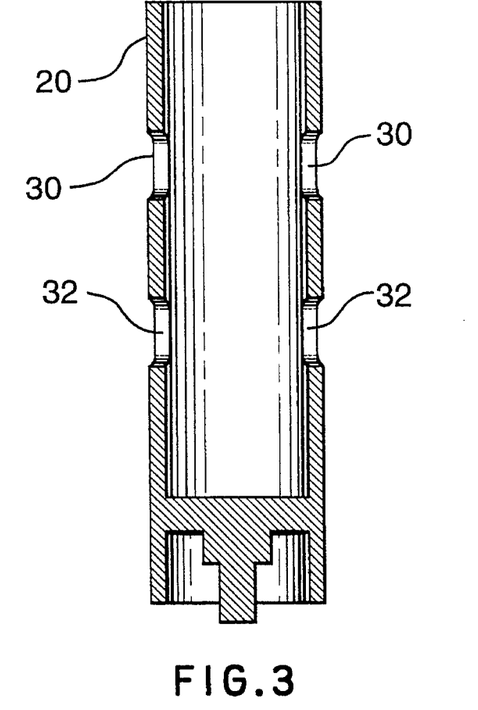
FIG. 3 is a view of a rotor that is a component of the regulator of FIG. 2.
Figure 4:
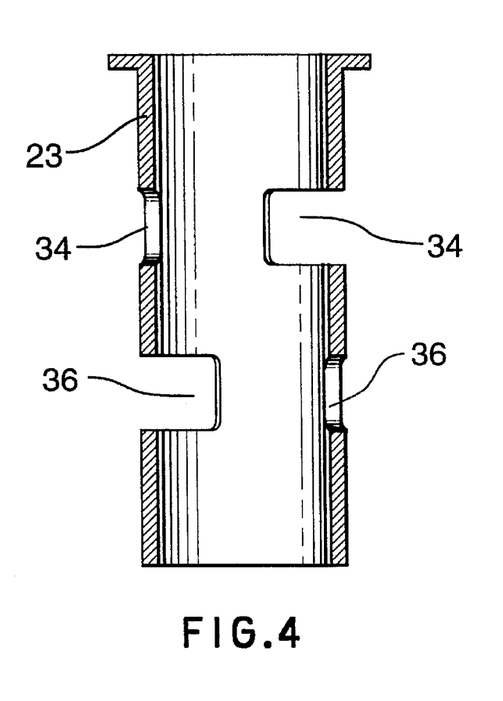
FIG. 4 is a view of a sleeve in which rotation of the rotor of FIG. 3 takes place.

The rotor 20 is provided with inlet windows 30 and exhaust windows 32, which correspond to the inlet windows 34 and exhaust windows 36 in the sleeve 23. When the rotor is turned clockwise from a centralised equilibrium position, the inlet windows 30 in the rotor start to lie over the inlet windows 34 in the sleeve. The number of degrees of angular movement of the rotor 20 is a measure of the size of the aperture thus created. The exhaust windows 32 in the rotor do not move over the exhaust windows 36 in the sleeve when the rotor rotates clockwise.

Similarly, when the rotor rotates anti-clockwise, the exhaust windows 32,36 overlap and the inlet windows 30,34 remain closed.

The magnitude of the aperture or orifice created by the windows sliding over each other determines the rate and velocity of flow of pressurised air from the inlet into the pressure tube, or from the pressure tube to exhaust.

Once pressure in the pressure tube has reached the desired value, the rotor resumes its centralised or null-position, where both the inlet and exhaust windows are closed.

The rotation of the rotor 20 is effected and controlled by means of a stepper motor 38, the armature of which is coupled to the rotor 20 via a coupling 40. The coupling 40 is effective to transmit only torque between the armature and the rotor, thereby relieving the rotor of the effects of any slight misalignment with the armature.

It may be noted that nothing in the mechanical structure of the regulator 12 is set by, or depends on, the pressure in the pressure tube 18. In particular, it may be noted that the windows lie over each other in an open or closed position entirely in dependence upon the electrical setting of the stepper motor, and not at all in dependence upon the pneumatic pressure in the pressure tube. In conventional pressure regulators, often an aperture-closure-member is acted upon by the pressure in the pressure tube, whereby as the pressure rises, the pressure urges the closure member to reduce the aperture. This is not the case in the present design, where any pressure in the pressure tube, or in any other part of the regulator, has no effect on the orientation of the rotor.

It is important, from the standpoint of speed of response, accuracy, and reliability of the regulator that there be as little friction as possible between the rotor 20 and the sleeve 23. Preferably, the rotor is made of stainless steel, and the sleeve from a bearing-material compatible therewith.

It is important that the fit of the relatively moving parts on each other should not change even if temperature and other ambient conditions should change (as they do, in aircraft). The designer preferably would avoid the use of plastic materials for the sleeve or rotor, therefore, since plastic materials are often not so dimensionally stable under extreme variations in the environment.

The rotor and sleeve are in a journal-bearing relationship, and because of the design of the regulator there is very little side or radial loading between the rotor and the sleeve, and it is recognised that air bearings, comprising a trickle of air supplied at the inlet pressure, will suffice to hold the rotor and sleeve apart. Accordingly, passages 43 are provided in the housing 25, which conduct air from the inlet port to air-bearings 45,47, The air bearings 45,47 are hydrostatic, in that they are supplied with pressurised air throughout operation of the regulator, and so long as the regulator is supplied with pressurised air.

Air bearings leak air, and the leakage may track its way to the exhaust port, and also into the pressure tube. However, this can usually be ignored; if the leakage causes an increase in the pressure in the anti-G suit, the sensors and the computer will detect that, and will open the exhaust window to maintain the desired suit pressure.

The magnitude of leakage of air from the air bearings 45,47 is not large, since the air bearings comprise such a very small clearance between the rotor and the sleeve. However, the designer might wish to see to it that such leakage is minimised. In that case, seals may be incorporated into the design.

Figure 7:
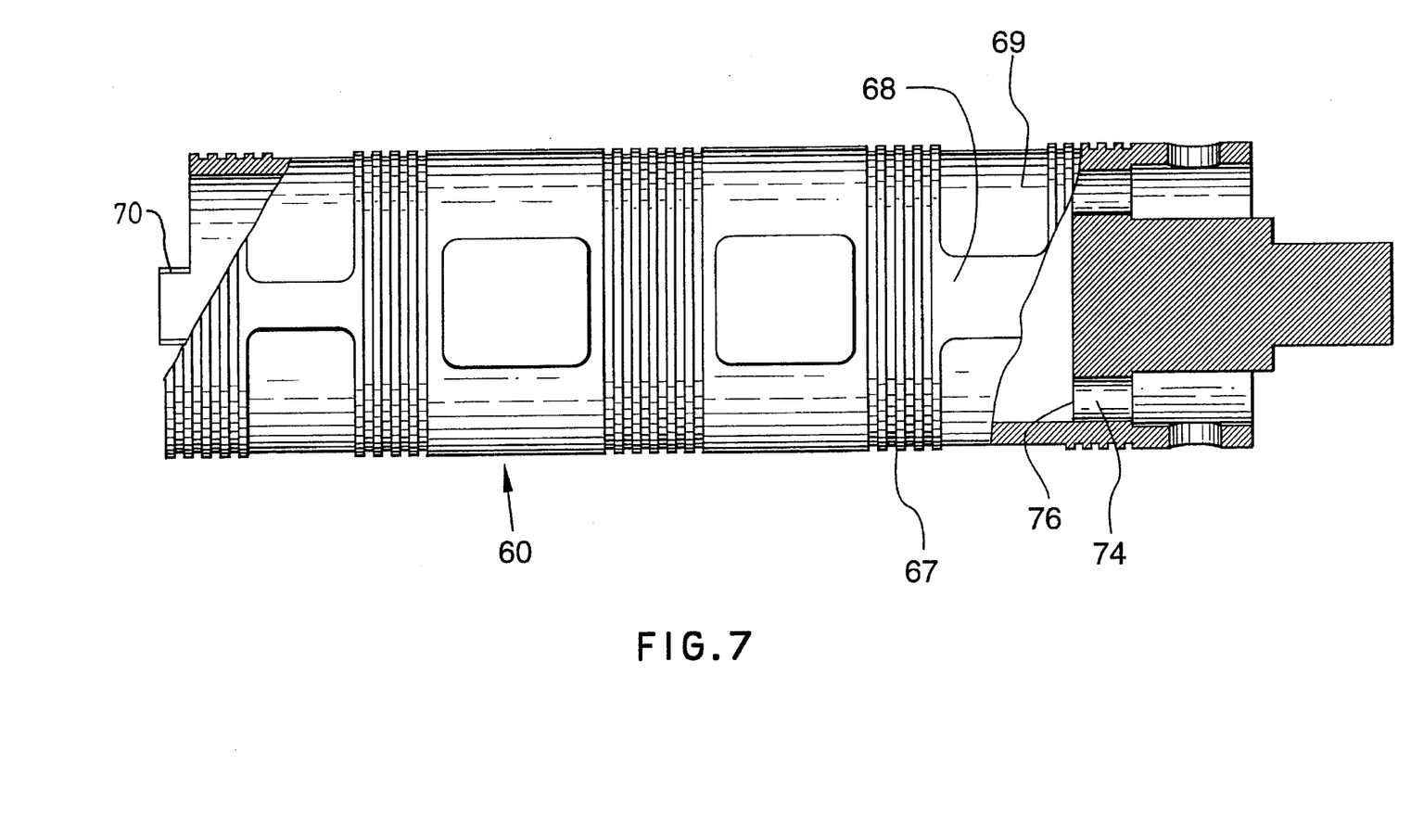
FIG. 7 is a view of a rotor that is a component of the regulator of FIG. 6.

It is preferable to avoid elastomeric seals between the rotor and the sleeve, because elastomeric seals add rubbing friction and introduce hysteresis, and are liable to fail. A labyrinth seal is preferred for minimising leakage of air from the air bearings. A labyrinth seal may be provided by forming many small grooves in the outer surface of the rotor, as shown at 67 (FIG. 7).

The amount of leakage through air bearings increases with pressure, Therefore, it may be found that even at the null-position of the rotor, in which the pressure in the suit is being maintained constant, a small compensatory movement of air into or out of the suit will be required. The system will automatically signal the need for such small equilibrium-maintaining air-flows. The magnitude of the air-flow needed will very with the pressure.

The stepper motor 38 may be subject to slippage and other errors, whereby the angular position of the armature of the motor for any given input signal may vary over time. A magnet 50 is attached to the rotor, to assist in periodic re-alignment and re-orientation of the rotor.

With the window arrangement as shown, the rotor would step through about 90 degrees clockwise to fully uncover the exhaust window, and the same anti-clockwise to uncover the inlet window. An appropriate number of steps would be around ten steps for the 90 degrees, ie the stepper motor 36 should be the kind which has at least forty steps or more per revolution. Proprietary stepper motors generally have far more available steps per revolution than forty. That is to say: there is no difficulty in selecting a stepper motor which has the required sensitivity to operate as described.

The rotor 20 is constrained in the housing against any other mode of movement except rotation about the cylindrical axis of the rotor. As such, the rotor is not affected by the G-force experienced by the aircraft. A linearly-moving, or sliding, component in the regulator, by contrast, would be affected by such G-forces, which would affect the accuracy and controllability of the regulation. Also, the angular momentum of a rotor about its cylindrical axis is much less than the linear momentum of a slider of corresponding size.

The inlet windows and the exhaust windows are each divided into two half portions, which are situated in diametric balance on opposite sides of the rotor. Therefore, when air flows into or out of the windows, the momentum of the flow does not give rise to a reaction to one side or the other. If the flow were to take place only through a single window, the resulting reaction force would be transmitted to the air bearings. Air bearings perform best (at least at low rotational speeds) when subjected to only nominal radial or side loads.

It may be noted that the momentum of the flow does not tend to carry the windows with it: that is to say, the windows are neither pushed open nor pushed closed by the flow of air, no matter how vigorous that flow. In the design as described, the opening of the windows is virtually completely neutral as regards susceptibility to the effects of any forces other than the forces transmitted to the rotor from the stepper motor. Therefore, the stepper motor is not required to deliver much by way of overcoming spurious forces and resistances, and can be set for light, yet positive, fast, response.

In order to provide a good circumferential length of window, the inlet windows and the exhaust windows may be at two different axial locations as shown. If all the windows were at the same axial location, especially since the windows are divided into half-portions, each window would have to be circumferentially quite short. The two half portions of the one window can be spaced or staggered axially, which allows for even more circumferential length to the windows, if desired. The designer will incur little penalty by extending the axial length of the rotor so as to accommodate axially-staggered windows.

It will be noted that the windows in the rotor extend through the walls of the rotor, which are thin. Therefore, the length of the flow-restricting pathway is short. When the window is just open (ie almost closed) for example, the short restricted flow aperture is backed by wide open zones. This again makes for fast, positive, controllable, response. If the window were long, ie long in the direction of flow of air through the window, then especially when the window was almost closed, it would take a non-negligible lag time for the small flow of air to become established into or out of the interior chamber of the rotor. In the described design, the rotor walls are enabled to be thin because the outlet to the receptacle comprise the hollow interior of the rotor, and therefore the windows communicate directly with the output passage. The fact that the rotor is a thin-walled tube is therefore a preferred feature of the invention.

The low-inertia, balanced, rotor as described, can snap to a new angular position quickly, and can stop accurately at the new position. Such a rotor has little angular momentum, and is not significantly vulnerable to overshoot or other instabilities. By feeding the output to the receptacle directly from the hollow interior of the rotor, and placing the windows in the cylindrical wall of the rotor, both the increase and decrease of the pressure in the receptacle can be handled with the same positive, controlled, accuracy. This is important in a fighter aircraft, where, during combat, the rotor can be expected to be in constant motion, accelerating, stopping, reversing, and stopping again.

Figure 5:
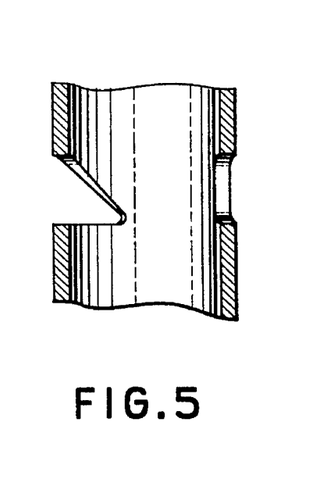
FIG. 5 is a developed view of a modified form of overlapping windows.

It may be arranged that the windows overlap and uncover each other in a more advantageous manner than if the windows are basically rectangular as in FIG. 2. FIG. 5 shows triangular overlap of the windows, which provides a more linear relationship between air-flow-through rate and the angle of orientation of the rotor.

Figure 6:
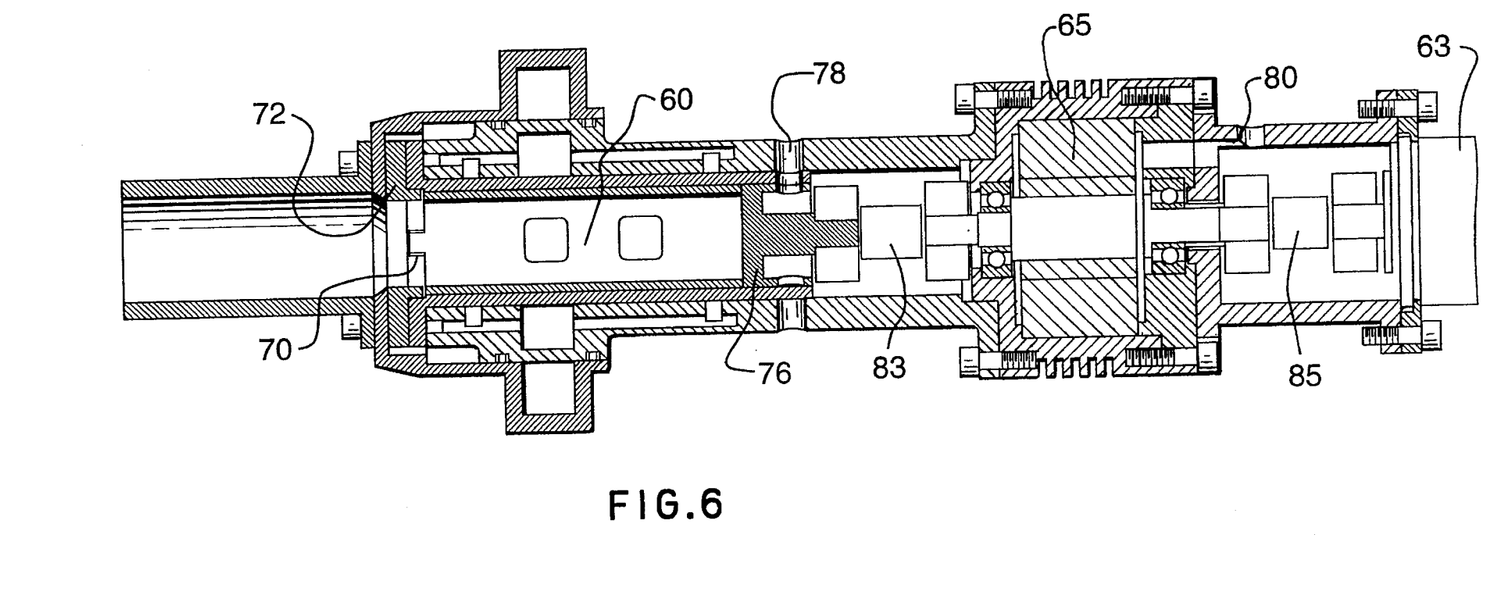
FIG. 6 is a cross-section of another pressure regulator.

FIG. 6 shows a regulator of somewhat different design. Here the rotational orientation of the rotor 60 is set by a (conventional) rotary-variable-displacement-transducer (RVDT) 63, rather than by the magnet and sensor as in FIG. 2. Rotation of the rotor is controlled by a servo motor 65. The servo motor 65 and the RVDT 63 together serve to move the rotor 60 rapidly, but with great stability, to new orientations as required according to signals fed into the RVDT and motor. As the requirement for re-orientation of the rotor arises, the RVDT measures the error between the actual orientation of the rotor and the desired orientation, and provides a signal corresponding to the error; this signal is used in the usual negative-feedback loop to drive the error to zero.

FIG. 7 shows the rotor 60 in more detail, The grooves 67 for the labyrinth seals for the air bearings may be observed, along with pillows 68 and pockets 69, which serve to enhance the performance of the air bearings.

The rotor is formed with a nose 70, which interacts with a limiter 72 to limit the angular movement of the rotor.

The rotor 60 is provided with through-holes 74, which serve to equalise pressure either side of the main structural wall 76 of the rotor. Thus, there is no net pressure acting to load the rotor in the axial sense; if such axial loading were present, thrust bearings would be needed to react the axial force.

The hole 78 (FIG. 6) serves to receive a peg, by means of which the rotor 60 can be accurately aligned rotationally with the body of the regulator, when setting up, and when checking the alignment of, the rotor. The hole 78 is plugged during normal operation. Similarly, the hole 80, through which electrical leads to the servo-motor 65 are passed, is sealed during normal operation.

A coupling 83 ensures that no spurious misalignments can be transmitted between the servo motor 65 and the rotor 60. Similarly, a coupling 85 isolates the RVDT 63 from the servo-motor.

It will be understood that in the systems as just described, the item that is under control is the size of the aperture in the pressure regulator, The computer issues a signal stating how wide open the aperture is to be at a particular instant. The computer carries out the calculation based on empirical formulas; for example, that xx psi pressure differential requires zz sq cm of aperture opening, as an empirical relationship. As the air flows in, to equalise the pressure, the formula indicates that a smaller opening of the aperture is now required. (The empirical relationship is not necessarily mathematically simple: for example, it might be appropriate in some cases for the aperture opening to depend, at least in part, on the rate of change of the pressure differential.)

It is not essential that the aperture opening be updated in a smooth, step-less manner. For example, it may be appropriate for the required pressure differential to be determined periodically; in that case, the aperture is kept at the last opening-setting until the next update. In fact, in that case, the aperture, instead of remaining static during the period between updates, may be set to change, between updates, according to some pre-determined formula which anticipates what the next opening of the aperture, following the next update, may be expected to be.

The pressure regulator as described may be used in many different situations in which very tight, fast-acting, stable, control of a varying pressure is required, besides the aircraft anti-G suit; in robotics generally, for example. Other systems may require certain departures from the general layout as described. In the system as described, for instance, excess pressure in the pressure-receiving device, ie in the anti-G suit in the case described, is exhausted back through the same rotor in the regulator; but in many systems, any excess pressure in the pressure-receiving device is exhausted downstream, and not back through the regulator, for example by pressure-proportional-leakage. In that case, the regulator structure would have no need for exhaust windows.

Another area to which the invention may be applied is in the field of medical anaesthesia controls, In this field, the mixing ratio of gases is critical, and so are the volumetric flow rate, the pressure, the pressure-profile over a breathing cycle, etc. When the invention is used in such fields, the relevant parameters can be sensed by transducers and processed by computer, and the computations used to update a servo-motor, which controls the aperture of the pressure regulator.

In the case of anaesthesia gases, where different gases are to be mixed, separate pressure regulators would be required for each gas. However, the invention is applicable because the computer can be programmed to handle two or more regulators simultaneously, ie to handle mixtures of gases, as easily as it can to handle single regulators and single gases.

In an anaesthesia system, the exhaust gases may be arranged to be exhausted through the regulator, as in the systems shown herein, or may be arranged to be exhausted remotely, without passing through the regulator.

The invention would not be particularly applicable, on the other hand, to such cases as the mixing of gases for an oxy-acetylene torch. Here, there would be little benefit arising from the use of the pressure regulator of the invention, because, in such cases, there is little need for the critical refinement, accuracy, and stable response that are key features of the invention.

We claim:

1. A rapid-response pressure regulation system, for supplying air or other gas at regulated pressure to a receptacle, wherein:

the system includes a pressure regulator having a pressure pipe connection to the receptacle;

the regulator includes a housing, and includes a rotor which is mounted for rotation in the housing;

the rotor comprises a sleeve, of cylindrical form, having a thin annular wall, defining a hollow interior chamber;

the housing is formed with an internal cylindrical surface, of complementary dimensions to an external surface of the rotor, and in which the rotor is received for rotation;

the internal cylindrical surface of the housing is formed with at least one opening that defines a housing-inlet-window, which is communicable with a supply of pressurised gas;

the annular wall of the rotor is formed with a rotor-inlet-window;

the rotor-inlet-window comprises at least one hole through the annular wall, into the hollow interior chamber of the rotor;

the system includes an electric motor means which, in response to an electrical signal, is effective to rotate the rotor to a particular angular position relative to the housing in accordance with the level of the said signal;

the rotor-inlet-window is arranged in rotary overlapping relationship with the housing-inlet-window;

the arrangement of the regulator is such that, when the rotor rotates to a new angular position, the degree of rotary overlap between the windows changes proportionately in accordance with the angular position of the rotor in the housing;

the arrangement of the regulator is such that the degree to which the rotor-inlet-window overlaps the housing-inlet-window is effective to define an aperture, the size of which determines the rate of flow of gas through the regulator, to the receptacle;

the system includes a computer;

the computer is capable of receiving signals from sensors, being sensors which indicate a requirement for a change in the magnitude of the pressure in the receptacle;

the computer is programmed to issue an output signal, the level of which is such as to indicate the direction and the magnitude of the required change in pressure, in response to the signals from the sensors;

the output signal of the computer comprises the said electrical signal to the electric motor means;

and the motor means is effective to hold the rotor at the said new angular position while the level of the output signal continues to indicate that same direction and magnitude of the required change in pressure.

2. System of claim 1, wherein the regulator includes means constraining the rotor against all modes of motion other than rotation about the cylindrical axis of the rotor.

3. System of claim 1, wherein the motor means is an electrically powered rotary stepper motor, in which an armature of the stepper motor is movable in steps to different angular positions of the armature in response to electrical signals received into the stepper motor.

4. System of claim 3, wherein the stepper motor is of the type that can be stepped at least forty steps per revolution.

5. System of claim 1, wherein:

the window in the rotor and the window in the housing each have a leading edge, being the edges of the windows which first overlap when the rotor rotates in the direction to increase the size of the window;

and the leading edge of the window in the rotor is inclined at an angle to the leading edge of the corresponding window in the housing.

6. System of claim 1, wherein the system includes a means for indicating a reference angular position of the rotor, comprising a magnet fitted to the rotor, and a magnetic sensor mounted in the housing.

7. System of claim 1, wherein:

the system includes a means for providing, during operation, an electrical signal corresponding to the actual angular orientation of the rotor, and thereby to the size of the opening of the aperture;

the system includes a means for determining the required orientation of the rotor, and for providing an electrical signal corresponding to the required orientation;

the system includes a means for comparing the signal corresponding to the actual orientation of the rotor to the signal corresponding to the required orientation of the rotor, and for providing a signal in accordance with the comparison;

the system includes a servo-motor, which is arranged for driving the rotor, and which is so arranged as to receive the comparison signal, and, in response thereto, to drive the rotor in such a manner as to reduce the error between the actual orientation and the required orientation to zero.

8. System of claim 1, wherein:

the windows in the rotor and the housing are divided each into respective balance-portions of the windows;

the balance-portions are so disposed that the flow of air through the windows is divided between the respective balance-portions;

the balance-portions of the windows are so disposed that the flow of air is so divided between the balance-portions that dynamic forces due to momentum of the flow are balanced radially with respect to the rotor, and leave substantially no net radial reaction force between the housing end the rotor.

9. System of claim 1, wherein the pressure pipe connection to the receptacle opens directly into the interior chamber of the rotor, whereby the pressure in the pressure pipe connection equals the pressure in the interior chamber of the rotor, irrespective of the angular position of the rotor.

10. System of claim 9, wherein the hollow interior of the rotor is so large, and the pressure pipe connection to the receptacle is so wide open, that substantially no significant pressure lag or differential can obtain between the rotor-inlet-window and the receptacle, even when the size of the aperture is changing rapidly.

11. System of claim 1, wherein, in addition to the rotor-inlet-window and the housing-inlet-window, the regulator also includes a corresponding rotor-exhaust-window and housing-exhaust-window.

12. System of claim 11, wherein the said inlet windows in the rotor and the housing are spaced apart from the exhaust windows in the rotor and the housing, at a different axial location along the cylindrical axis of the rotor.

13. System of claim 11, wherein:

the arrangement of the windows is such that in a null position of the rotor the exhaust window in the rotor lies offset to one side of the exhaust window in the housing, whereby the interior chamber of the rotor is isolated from the exhaust port, and is such that when the rotor rotates progressively clockwise from the null position the exhaust window in the rotor moves to uncover the exhaust window in the housing whereby the interior chamber of the rotor then is progressively opened to the exhaust port;

and the arrangement of the windows is such that in the null position of the rotor the inlet window of the rotor lies offset to one side of the inlet window of the housing, whereby the interior chamber of the rotor is isolated from the inlet port, and is such that when the rotor rotates progressively anti-clockwise from the null position the inlet window in the rotor moves to uncover the inlet window of the housing whereby the interior chamber of the rotor then is progressively opened to the inlet port.

14. System of claim 1, wherein a gas bearing obtains between the rotor and the housing, in that:

the external surface of the rotor and the internal surface of the housing are so dimensioned at an interface therebetween as to be separated by a small interface gap, of a fit which is loose enough to permit the rotor to rotate freely in the housing, but is tight enough to support a substantial gas pressure differential between spaced points on the interface;

the regulator includes a means for applying a pressurised flow of gas into the said gap, at sufficient pressure to maintain a hydrostatic lubricating film of gas in the gap.

15. System of claim 14, wherein the pressurised flow of gas into the said gap comprises a bleed from the pressurised gas supplied to the housing-inlet-window.

16. System of claim 1, wherein the system includes a means for equalising axial forces on the rotor, whereby, during operation, no net axially-urging force obtains between the rotor and the housing.

17. System, of claim 16, wherein the means for equalising axial forces on the rotor comprises means for opening both axial ends of the rotor, whereby the gas pressure obtaining beyond both ends of the rotor equals the gas pressure obtaining inside the hollow interior of the rotor.

\* \* \* \* \*